(12) United States Patent
Siliqi

(10) Patent No.: US 8,139,441 B2
(45) Date of Patent: Mar. 20, 2012

(54) METHOD FOR BISPECTRAL PICKING OF ANELLIPTICAL NMO CORRECTION PARAMETERS

(75) Inventor: Risto Siliqi, Paris (FR)

(73) Assignee: Cggveritas Services SA, Massy (FR)

( * ) Notice: Subject to any disclaimer, the term of this patent is extended or adjusted under 35 U.S.C. 154(b) by 0 days.

(21) Appl. No.: 13/011,035

(22) Filed: Jan. 21, 2011

(65) Prior Publication Data

US 2011/0292765 A1 Dec. 1, 2011

Related U.S. Application Data

(63) Continuation of application No. 10/565,405, filed as application No. PCT/IB2004/002617 on Jul. 20, 2004, now Pat. No. 7,889,599.

(30) Foreign Application Priority Data

Jul. 21, 2003 (FR) ...................... 03 08861

(51) Int. Cl.
*G01V 1/00* (2006.01)
(52) U.S. Cl. ........................... 367/52; 367/40
(58) Field of Classification Search .................. 367/40, 367/50–52
See application file for complete search history.

(56) References Cited

U.S. PATENT DOCUMENTS

| | | | | |
|---|---|---|---|---|
| 6,067,275 A | * | 5/2000 | Sayers | 367/75 |
| 6,128,580 A | * | 10/2000 | Thomsen | 702/18 |
| 6,502,038 B1 | * | 12/2002 | Lazaratos et al. | 702/14 |
| 6,681,184 B2 | * | 1/2004 | Jenner et al. | 702/14 |
| 6,864,890 B2 | * | 3/2005 | Meek et al. | 345/440 |
| 2004/0041815 A1 | * | 3/2004 | Meek et al. | 345/582 |

* cited by examiner

*Primary Examiner* — Jack Keith
*Assistant Examiner* — Krystine Breier
(74) *Attorney, Agent, or Firm* — Potomac Patent Group PLLC

(57) ABSTRACT

Method of determining the velocity V and anellipticity η parameters for processing seismic traces in a common midpoint (CMP) gather comprising:—a preliminary step to define a plurality of nodes (dtn, $\tau_o$), for each node (dtn, $\tau_o$) defined in the preliminary step, the following steps:—for static NMO correction of traces in the CMP gather as a function of the values of the said parameters dtn and $\tau_o$ at the node considered, and calculation of the semblance function associated with the said NMO correction for the node considered; and—for each picked time $t_o$, a step including determination of the maximum semblance node (dtn ($t_o$), $\tau_o$ ($t_o$)),—and a final step to convert the dtn ($t_o$) and $\tau_o$ ($t_o$) parameters, so as to obtain the velocity $t_o$) and anellepticity η ($t_o$) laws.

17 Claims, 10 Drawing Sheets

METHOD FOR BISPECTRAL PICKING OF ANELLIPTICAL NMO CORRECTION PARAMETERS

The field of this invention is seismic prospecting. The invention relates particularly to processing of seismic traces in a common midpoint gather.

The invention is more precisely related to a method of determining velocity V and anellipticity η parameters necessary to perform processing including NMO correction of seismic traces.

Seismic prospecting usually consists of emitting seismic waves in the subsoil using one or several seismic sources, and making surface records of seismic data corresponding to seismic waves reflected on geological interfaces in the subsoil as a function of time (also called reflectors) using receivers (also called geophones or hydrophones) depending on whether the prospecting is being done on land or at sea) and then processing these data to extract useful information about the geology of the subsoil.

The record of the seismic energy produced by each receiver during data acquisition is called a seismic trace.

One conventional technique for seismic prospecting is multiple coverage, in which sources and receivers are arranged such that several seismic traces are grouped together at the same midpoint (in other words the point at equal distance between the source and the receiver for a given trace).

Although seismic traces contain useful information about seismic reflections and geology of the subsoil, they also contain noise components.

One of the first purposes of the processing of seismic data is to eliminate, or at least attenuate, these unwanted noise components such that the useful information can be clearly identified and interpreted.

One conventional method used to attenuate these noise components is Common MidPoint (CMP) gather. Traces with the same midpoint are then grouped as a function of the distance between the source and the receiver (called the offset).

In general, representation of seismic data in images requires the use of processing including:

a so-called TZO (Transform to Zero Offset) operation designed to compensate for the NMO effect of paths by correcting the arrival time of reflections to the arrival time of traces with zero offset, and a migration operation designed to reproduce the correct shapes of the geological interfaces.

Although these TZO and migration operations are usually carried out one after the other, they can be carried out jointly. This is the case particularly when a time migration is done before stack (PSTM—Pre-Stack Time Migration).

In a simplified manner, the TZO operation simulates acquisition of seismic data by sources and receivers placed at the common mid-point.

The purpose is to add records illuminating the same point in the subsoil to increase the signal to noise ratio and the primary reflections to secondary reflections ratio, and thus benefit from the advantages of "multiple coverage".

In order to make a zero offset image, a so-called obliqueness correction method or NMO (Normal Move Out) correction method is used.

If it is assumed that the subsoil is horizontally stratified with no lateral variation of the propagation velocities, it can be shown that records that have the property of illuminating the same point in the subsoil are records that have the same midpoint.

However, the image of a reflection in the subsoil arrives at variable times depending on the offset. Therefore, in order to stack reflections, it is necessary to start by correcting the various records to bring them all to a common zero offset reference.

Historically, the NMO correction is based on a particularly simple model of the subsoil; a homogeneous model with horizontal reflectors.

In this model, reflections associated with each subsoil reflector are theoretically aligned along hyperbolas also called indicators, centred vertically above the midpoint.

The arrival time of a reflection is then a hyperbolic function of the source-receiver offset, the shortest time being obtained at zero offset.

In order to stack records in each gather, the NMO correction straightens the hyperbolas until they are theoretically horizontal.

The NMO correction is then made based on the following hyperbolic equation for the travel time t after reflection, associated with a source-receiver offset x pair:

$$t^2 = t_0^2 + \left(\frac{x}{V}\right)^2$$

in which $t_0$ represents the zero offset travel time and V denotes the average propagation velocity of waves in the subsoil.

The simplistic model mentioned above is based particularly on assumptions such as low angles of incidence and an isotropic medium.

But assumptions made for the simplistic model are too restrictive to describe a complex medium, and in particular cannot be applied to the propagation of seismic waves in an anisotropic medium (medium in which the velocity of waves can vary depending on the propagation direction).

The use of a less simplistic model is necessary, particularly due to:

the use of long streamers for acquisition in deep offshore, which in particular means that traces with far offsets are acquired;

observation of anisotropy in clayey type sediments.

The generally accepted assumption consists of modelling an anisotropic medium as a stack of transversely isotropic layers with a vertical axis of symmetry. This is known as Vertical Transverse Isotropy (VTI).

Thus, it has been proposed to determine NMO corrections to be made by:

introducing vertical non-homogeneity into a homogenous VTI medium model, as presented in the document "ALKHALIFAH T. and TSVANKIN I., 1995, Velocity analysis for transversely isotropic media: Geophysics, 60, 1550-1566";

or by introducing VTI anisotropy into a model with stratified isotropic layers, as demonstrated in document "SILIQI R. and BOUSQUIE N., 2000, Anelliptic time processing based on an offset hyperbola approach, $70^{th}$ Ann. Internat. Mtg.: Soc. Of Expl. Geophys., 2245-2248".

This second approach combining vertical non-homogeneity and VTI anisotropy to give a new model of the subsoil, appears to be the best approach in most real cases studied.

The following equation for correction of the travel time t after reflection, using an anelliptic offset hyperbola, associated with a source—receiver offset x pair, is derived from this model:

$$t(V, \eta) = \frac{8\eta}{1+8\eta} t_0 + \sqrt{\left(\frac{t_0}{1+8\eta}\right)^2 + \frac{x^2}{(1+8\eta)V^2}} \quad \text{Equation (1a)}$$

where V is the velocity conventionally used in seismic corresponding to small offsets and η is a parameter, called the anellipticity parameter.

The document "SUAUDEAU E. and SILIQI R., 2001, Anelliptic pre-stack time migration, Annual International Meeting, CSEG Expanded Abstracts" also proposes to include the NMO correction by anelliptic offset hyperbola in the equation for the path time used during the PSTM migration operation.

The PSTM migration equation is conventionally expressed in the form of a double anelliptic offset hyperbola, which is the sum of two square roots (the Double Square Root (DSQR) equation).

Taking account of anellipticity, the expression for this constant offset equation, becomes:

$$t = \frac{8\eta}{1+8\eta} t_0 + \sqrt{\left(\frac{t_0/2}{1+8\eta}\right)^2 + \frac{(x - x_m + h)^2}{(1+8\eta)V^2}} + \sqrt{\left(\frac{t_0/2}{1+8\eta}\right)^2 + \frac{(x - x_m - h)^2}{(1+8\eta)V^2}} \quad \text{Equation (1b)}$$

where:
the V and η parameters are those mentioned above,
$x_m$ is the coordinates of the midpoints,
$x-x_m$ represents the migration aperture,
h is the half source-receiver offset,
$t_0$ is the double time for zero aperture of the operator.

Note that when the aperture $x-x_m$ of the migration is zero, the PSTM correction equation (1b) becomes the NMO correction equation (1a). Thus, the NMO correction forms a special case of the PSTM migration; the case of PSTM migration with zero aperture.

Therefore, finally, in order to perform seismic data processing including NMO correction taking account of vertical heterogeneity and VTI type anisotropy, it is necessary to determine the velocity V and anellipticity η parameters.

The said parameters V and η can conventionally be estimated by carrying out two passes such that:

during the first pass, the distribution of velocities V along the time axis is estimated, only using data with near offsets;

during the second pass, the anellipticity η is estimated along the time axis, using:

the distribution of velocities determined during the first pass, and all data (including data with far offsets).

The document entitled:

"SILIQI R. 2001, Technological leap in time processing focuses the data throughout anisotropic media: First Break, 19, No. 11, 612-618", has also demonstrated that the parameters V and η can be estimated in a single pass, during which bispectral analyses are carried out in order to simultaneously pick the V and η parameters along the time axis, using all data.

However, dense analyses of NMO correction parameters are preferably made when the correction equation no longer depends on the time $t_0$ (we then talk about static NMO correction).

A static correction effectively provides a means of offsetting all samples each forming traces of the same time δt, for a given offset.

Thus, when a static correction is made, the number of calculations to be made can be significantly reduced and the trace stretching phenomenon is eliminated, which makes the said dense analyses viable.

At the moment, the only way to make velocity and anellipticity analyses is to use two passes, in particular making use of parabolic approximations of NMO residuals, in order to obtain a dense picking of the V and η parameters.

In this context:

the first step is to estimate residual velocities, using near offset data, according to a first estimate of velocities;

the next step is to estimate anellipticity on all data, using velocity updates done previously.

A mute law must also be defined to estimate residual velocities, so as to only keep data that are considered as being near offset data.

However, the efficiency of the two-pass analysis is particularly sensitive to the choice of such a mute law.

On the other hand, the anellipticity η is estimated mainly making use of far offset data.

But, the anellipticity estimate made for far offset data is not very precise, such that the correction made is finally inaccurate.

One purpose of the invention is to overcome these limitations and disadvantages, by proposing a processing including a static NMO correction which is more efficient and more precise.

More precisely, the purpose of the invention is a dense determination of velocity V and anellipticity η parameters in a single pass using all available data, in other words making use of all offset ranges.

To achieve this, the invention proposes a method of determining the velocity V and anellipticity η parameters for processing seismic traces from a common midpoint (CMP) gather including an anelliptic NMO correction, comprising:

a preliminary step to define a plurality of nodes (dtn, $\tau_0$), the said nodes being indicative of parameters dtn and $\tau_0$ representing the NMO correction for the maximum offset and the zero offset travel time in hyperbolic coordinates, the said preliminary step being followed by for each node (dtn, $\tau_0$) defined in the preliminary step, steps for the NMO correction of traces in the CMP gather as a function of the values of the said parameters dtn and $\tau_0$ at the node considered, and for calculating the semblance function associated with the said NMO correction for the node considered; and for each picked time $t_0$, a step including determination of the maximum semblance node (dtn($t_0$), $\tau_0(t_0)$), and a final step to convert the dtn($t_0$) and $\tau_0(t_0)$ parameters so as to obtain the velocity V($t_0$) and anellepticity η($t_0$) laws.

According to a first embodiment of the invention, the processing done is a static NMO correction of seismic traces.

According to a second embodiment of the invention, the processing done is a PSTM migration of seismic traces, the said PSTM migration including a static PSTM NMO correction of the said seismic traces.

A preferred but non-limitative aspect of the process according to the invention relates to the definition of the dtn and $\tau_0$ parameters relative to the velocity V and the anellipticity η so as to make static NMO corrections, according to $$dtn = \frac{8\eta}{1+8\eta}t_0 + \sqrt{\left(\frac{t_0}{1+8\eta}\right)^2 + \frac{x_{max}^2}{(1+8\eta)V^2}}$$

and $$\tau_0 = \frac{t_0}{1+8\eta}.$$

Other aspects, purposes and advantages of this invention will become clearer after reading the following detailed description with reference to the attached Figures in which.

Figure 4:
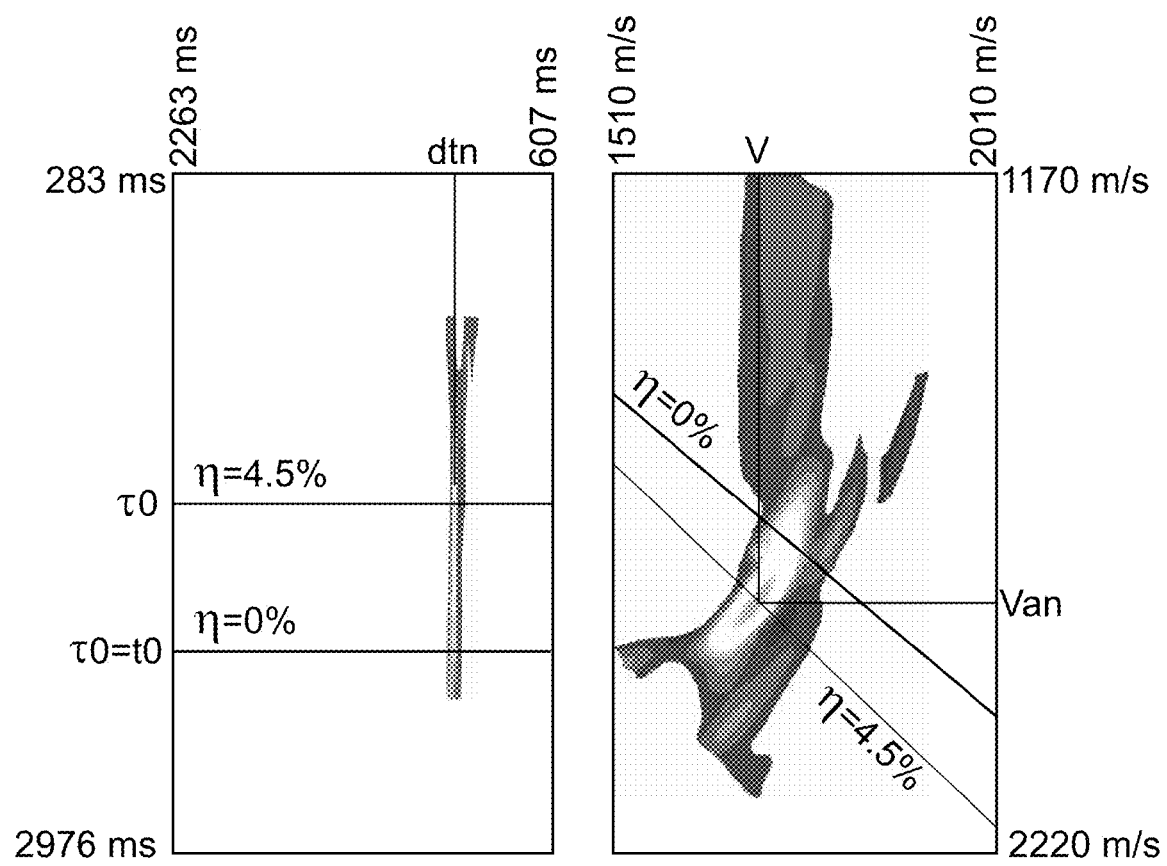
Figure 5:
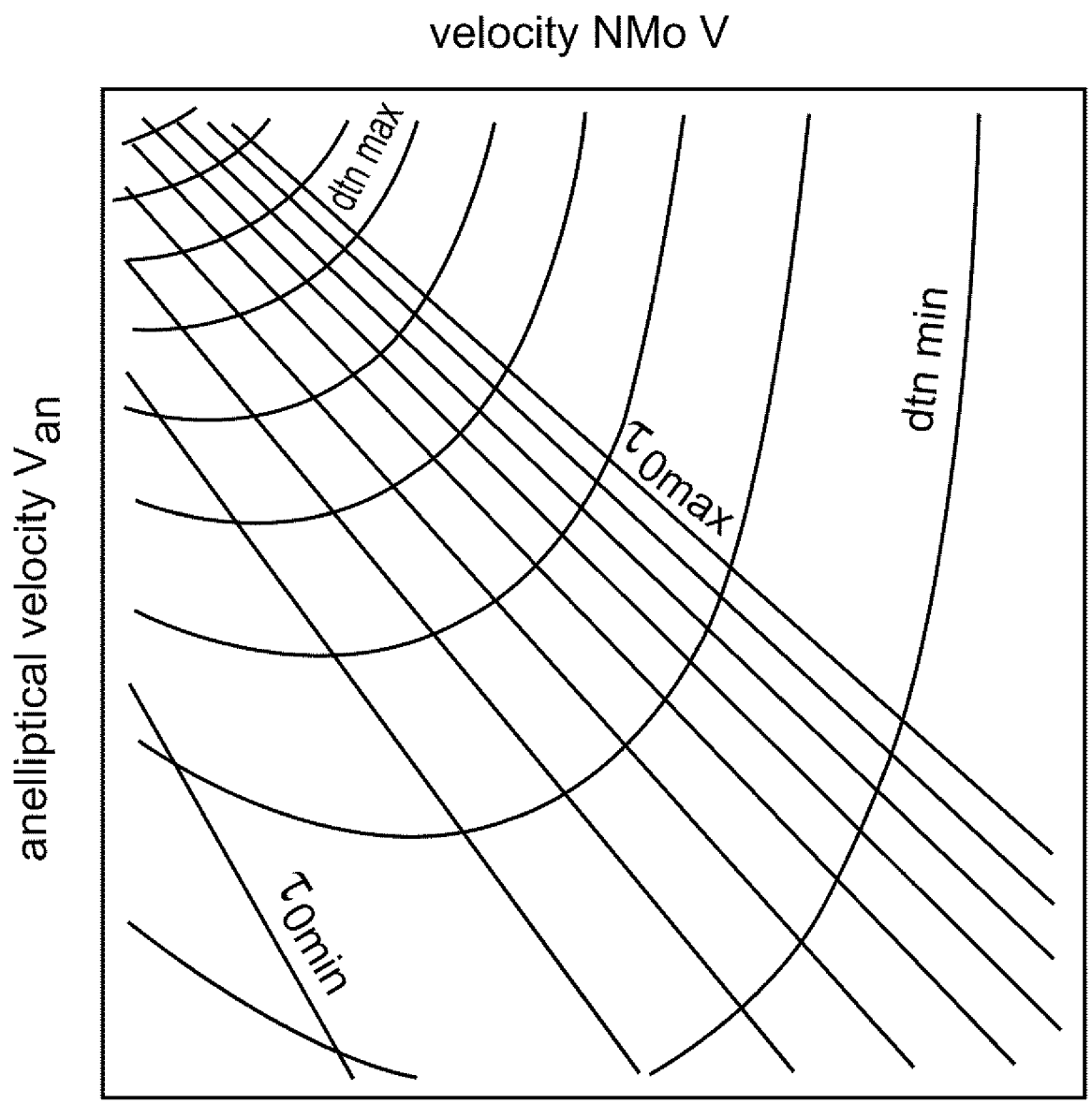
Figure 6:
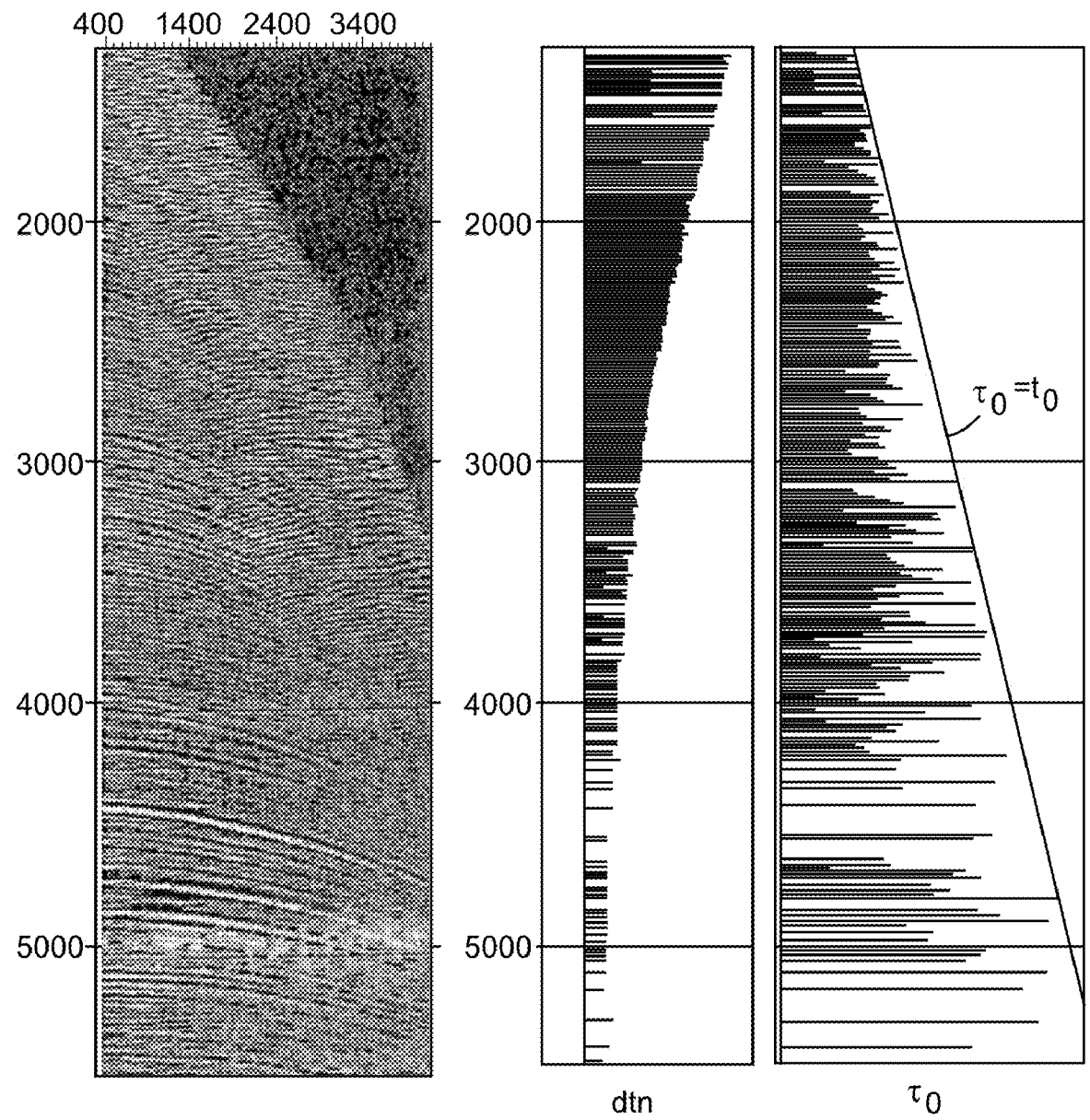
Figure 7:
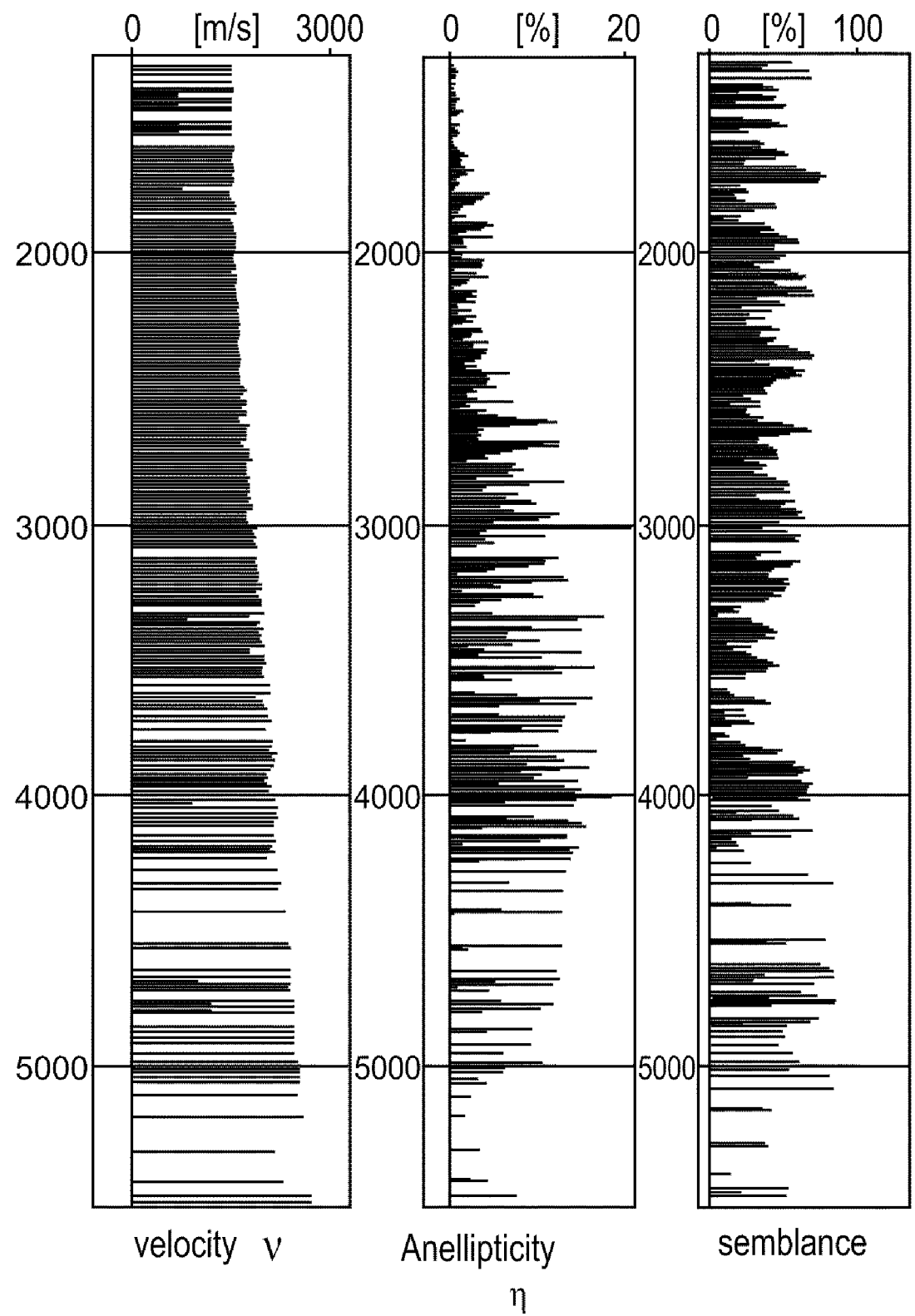

FIG. 4 combines each of (V, $V_{an}$) and (dtn, $\tau_0$) approaches, representing their corresponding bispectral analysis panel;

FIG. 5 shows the correspondence between the (dtn, $\tau_0$) and (V, $V_{an}$) pairs of NMO correction parameters;

FIG. 6 shows a CMP gather of true seismic traces before the NMO correction and the bispectral picking of the (dtn, $\tau_0$) parameters corresponding to this gather of traces;

FIG. 7 shows the semblance function and velocity and anellipticity functions deduced from the picking of the dtn and $\tau_0$ parameters in FIG. 6.

Figure 8A:
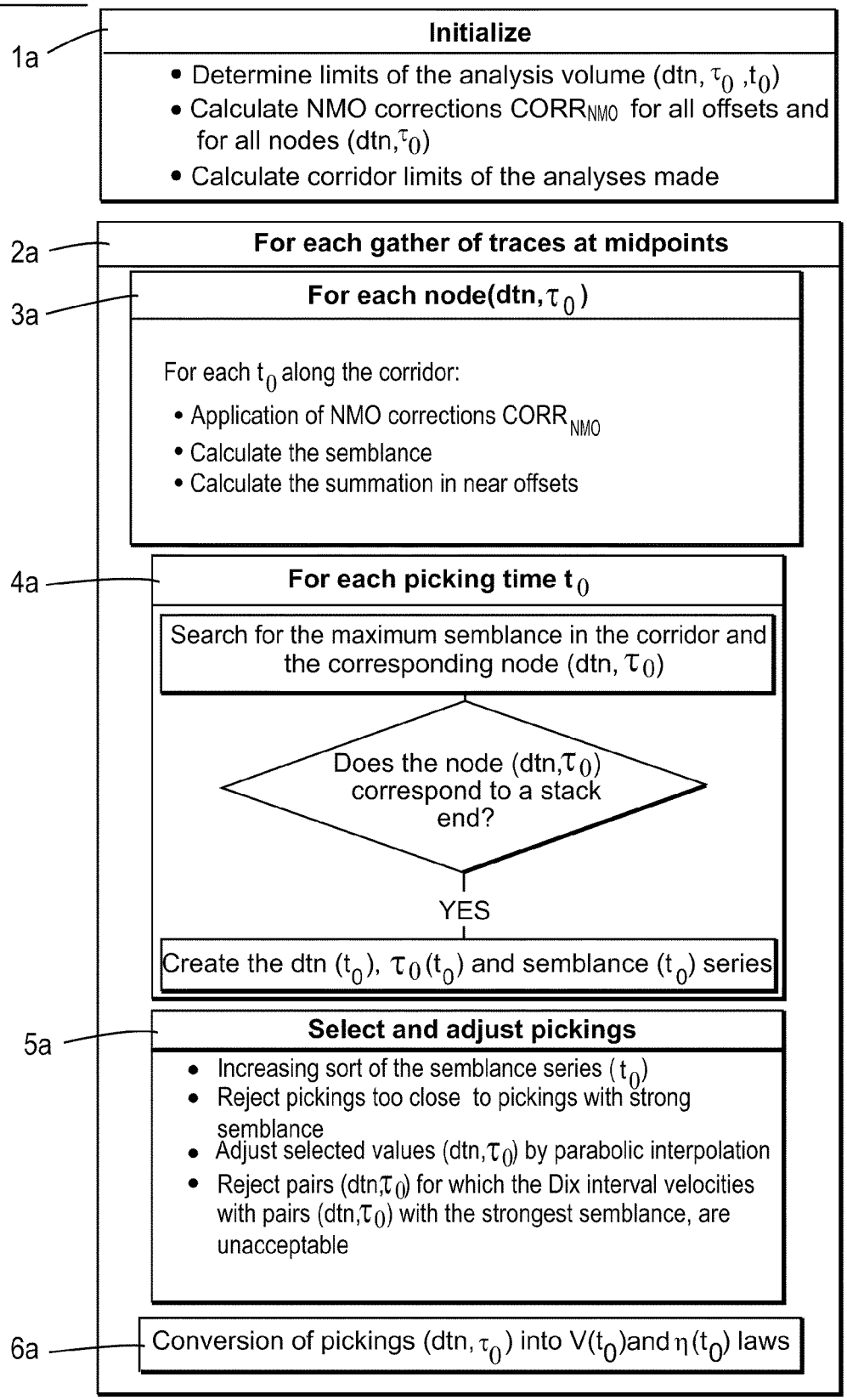
Figure 8B:
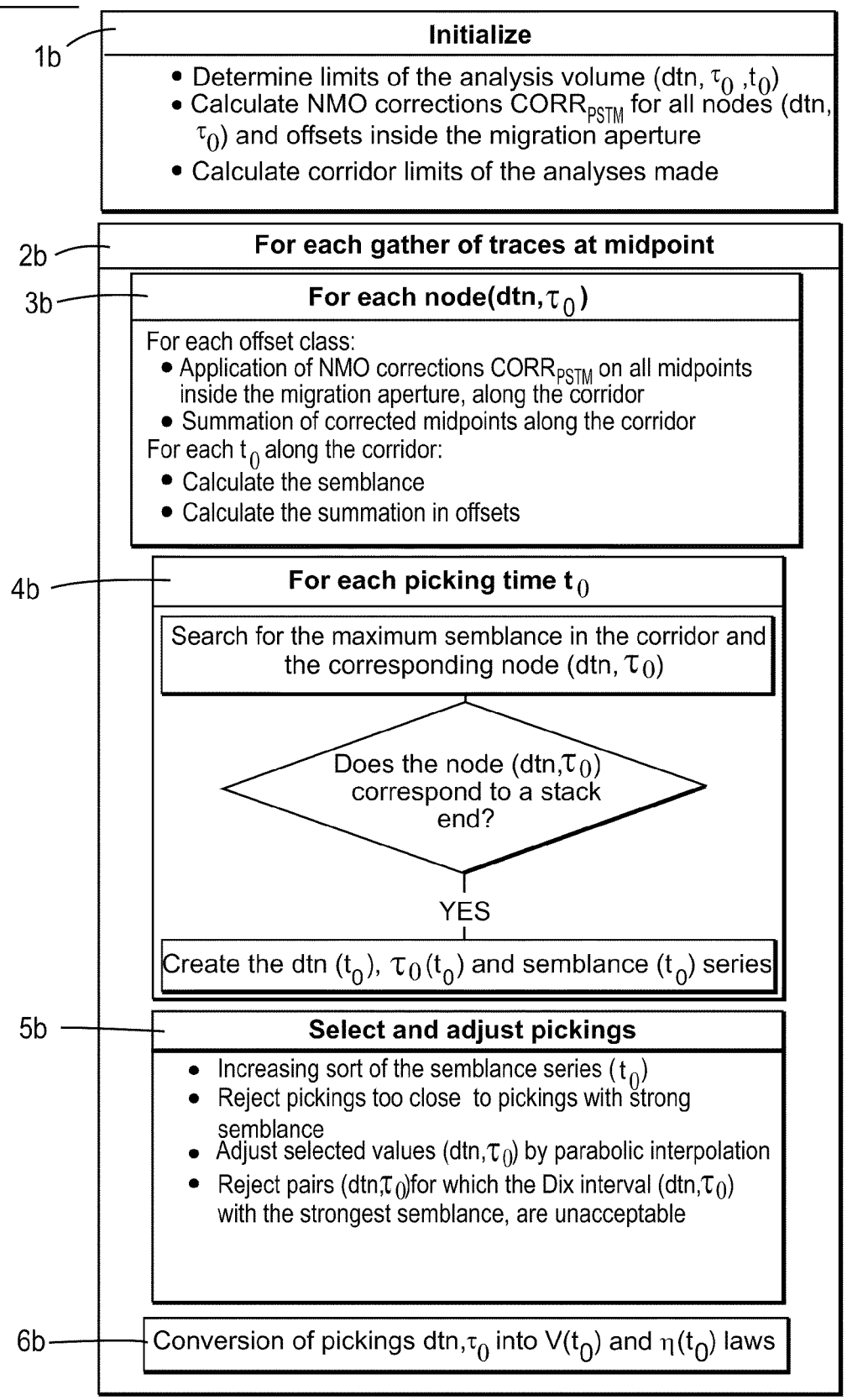
Figure 9:
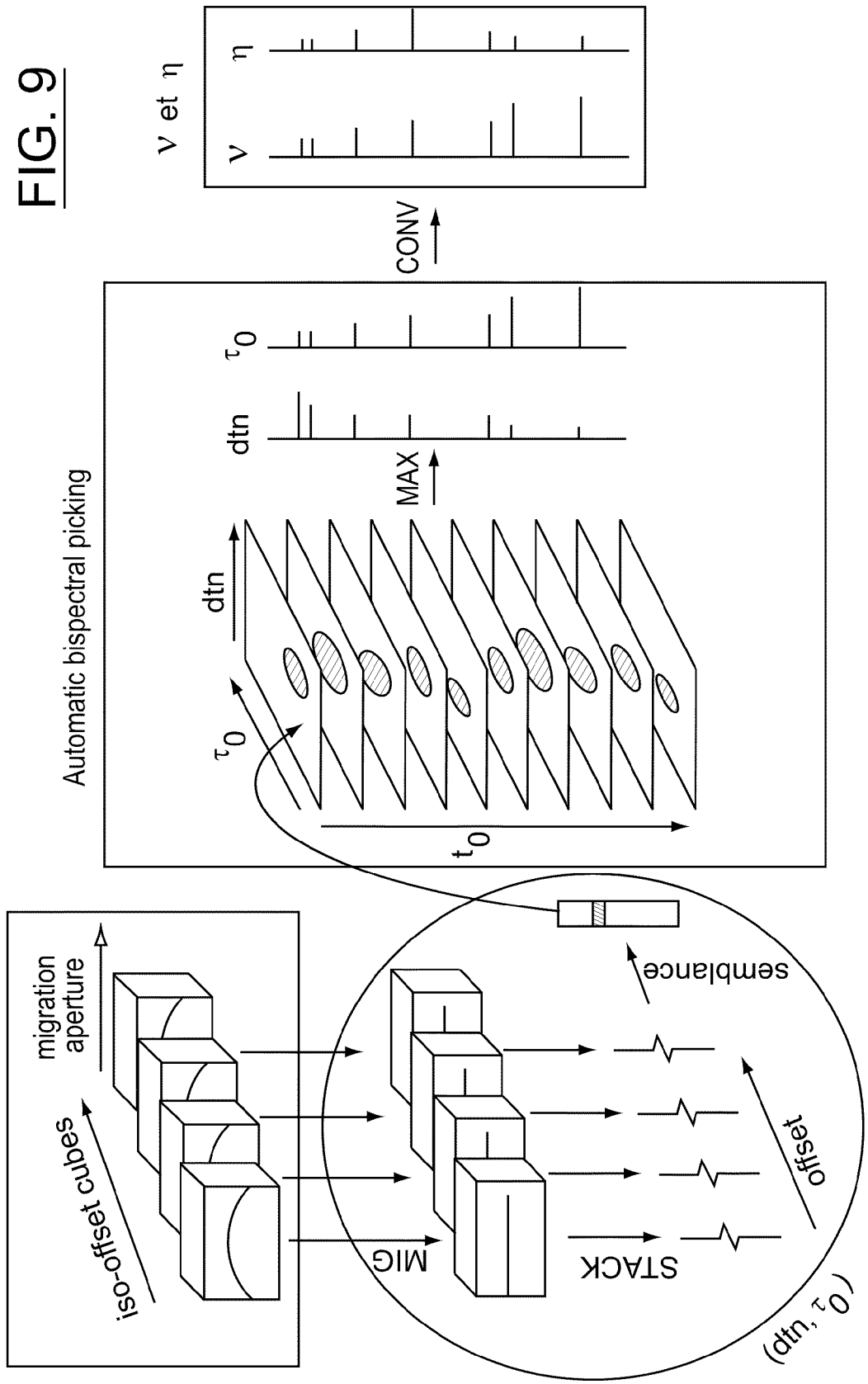

FIG. 8a is a flowchart representing the steps of a first particular embodiment of the invention, namely determination of the V and $\eta$ parameters to make an NMO correction;

FIG. 8b is a flowchart representing the steps of a second particular embodiment of the invention, namely determination of V and $\eta$ parameters to do a PSTM migration;

FIG. 9 is a diagram illustrating the different operations carried out in order to determine the V and $\eta$ parameters to make a PSTM migration.

In general, the method according to the invention is a method for processing records of variable offset seismic traces, and this processing uses the recorded seismic traces to build common midpoint (CMP) trace gathers, and the traces in each gather are subjected to an NMO correction.

In particular, the method according to the invention determines the velocity V and anellipticity $\eta$ parameters to perform processing including such an NMO correction of the seismic traces of a CMP gather.

For example, the said processing may be:

an anelliptic NMO correction of the seismic traces;

an anelliptic PSTM migration which, as we have seen above, jointly applies TZO and migration operations (in the following we will refer to a PSTM NMO correction).

The following description is more specifically applicable to the NMO correction. However, considering in particular the two particular embodiments of the invention that will be described below, we can see that this description is equally applicable to any processing including an NMO correction, particularly processing including a PSTM NMO correction.

Two new parameters dtn and $\tau_0$ are considered in order to specifically determine V and $\eta$:

$\tau_0$ that represents the zero offset travel time in "hyperbolic coordinates" (see FIG. 1), $$\tau_0 = \frac{t_0}{1+8\eta}\eta \qquad \text{Equation (2)}$$

and, dtn that represents the NMO correction for the largest offset $x_{max}$ (see FIG. 1), $dtn = t_{x=xmax} - t_{x=0}$ namely:

$$dtn = \frac{8\eta}{1+8\eta}t_0 + \sqrt{\left(\frac{t_0}{1+8\eta}\right)^2 + \frac{x_{max}^2}{(1+8\eta)V^2}} \qquad \text{Equation (3)}$$

It is important to note that dtn is defined relative to the velocity V and the anellipticity $\eta$, while $\tau_0$ is a perfectly anelliptical parameter defined relative to the anellipticity $\eta$, independent of V.

Accordingly, the velocity V and anellipticity $\eta$ parameters may be calculated in accordance with equations (2) and (3), using the following conversion equations (4) and (5):

$$V = \frac{x_{max}}{\sqrt{dtn(dtn+2\tau_0)\frac{t_0}{\tau_0}}} \qquad \text{Equation (4)}$$

and $$\eta = \frac{1}{8}\left(\frac{t_0}{\tau_0} - 1\right) \qquad \text{Equation (5)}$$

Figure 1A:
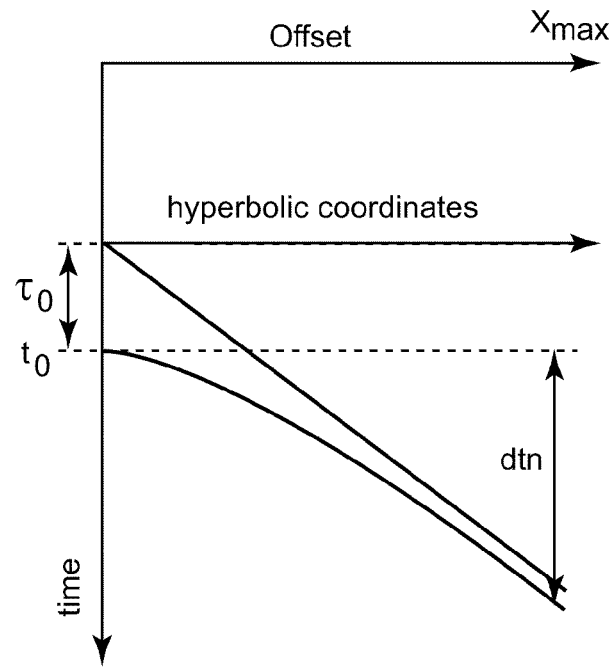
FIG. 1a shows the anelliptic offset hyperbola used to make the NMO correction and illustrates the meaning of the parameters $\tau_0$ and dtn.

FIG. 1a shows the anelliptical offset hyperbola used to make the NMO correction and illustrates the meaning of the $\tau_0$ and dtn parameters.

The said "hyperbolic coordinates" are shown in this FIG. 1. Their origin on the time axis is taken at the intersection of the said time axis with the asymptote tangent to the said far offset offset hyperbola (see equation (1a)).

Using the (dtn, $\tau_0$) parameters, equation (1a) for the anelliptical offset hyperbola becomes:

$$t = t_0 - \tau_0 + \sqrt{\tau_0^2 + \frac{dtn(dtn+2\tau_0)}{x_{max}^2}x^2} \qquad \text{Equation (6a)}$$

The (dtn, $\tau_0$) parameters defined for the velocity V and anellipticity $\eta$ are thus used to make the NMO correction $CORR_{NMO} = t - t_0$ to be applied to offset x traces independent of $t_0$:

$$CORR_{NMO}(x) = -\tau_0 + \sqrt{\tau_0^2 + \frac{dtn(dtn+2\tau_0)}{x_{max}^2}x^2} \qquad \text{Equation (7a)}$$

Therefore, this is a static NMO correction. In other words, the data recorded on a given offset trace will all be corrected in the same way for a (dtn, $\tau_0$) pair, independently of the time at which these data were acquired.

Consequently, the estimate of the velocity and anellipticity parameters is not disturbed by stretching of traces usually observed when dynamic NMO corrections are made.

Similarly using the two parameters (dtn, $\tau_0$), equation (1b) for the DSQR double offset hyperbola for the anelliptic PSTM migration becomes:

$$t = t_0 - \tau_0 + \sqrt{\frac{\tau_0^2}{4} + \frac{dtn(dtn + 2\tau_0)(x - x_m + h)^2}{x_{max}^2}} + \sqrt{\frac{\tau_0^2}{4} + \frac{dtn(dtn + 2\tau_0)(x - x_m - h)^2}{x_{max}^2}}$$ Equation (6b)

Figure 1B:
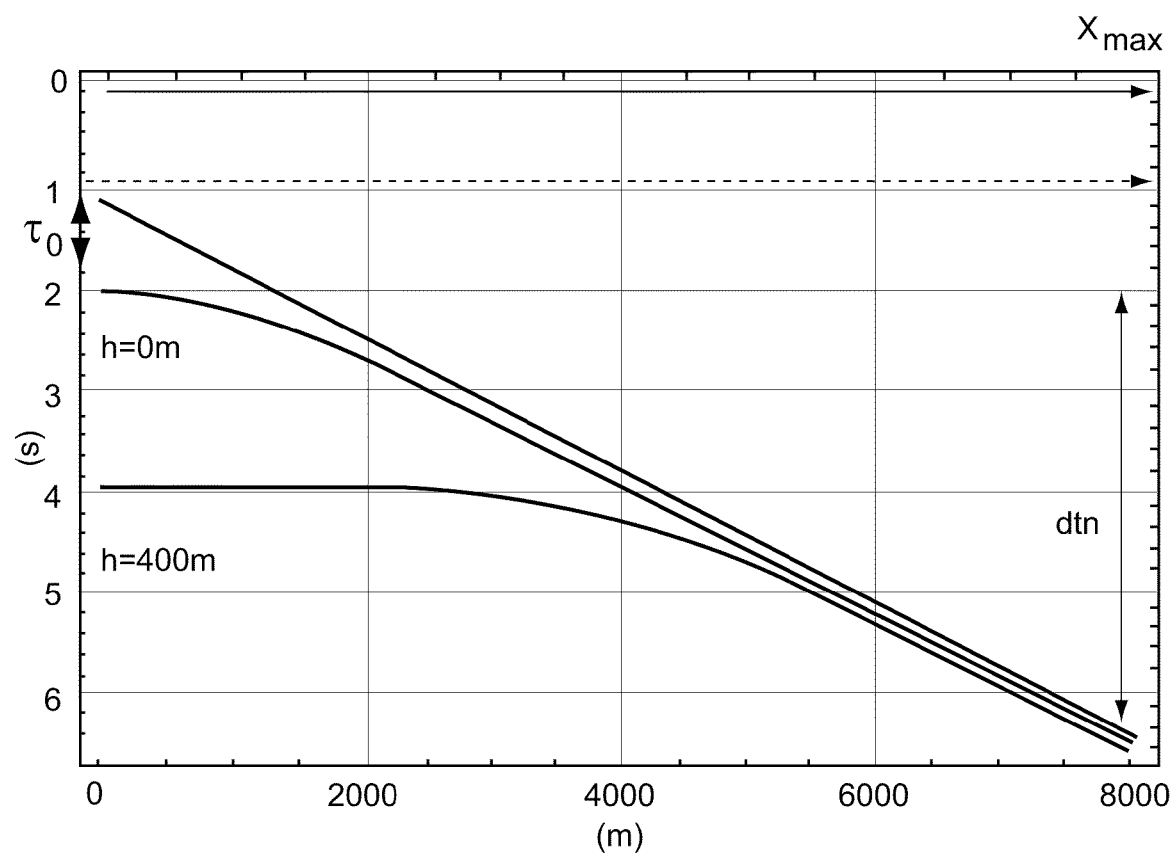
FIG. 1b represents the DSQR equation of the double anelliptic offset hyperbola of the PSTM migration and illustrates the meaning of the $\tau_0$ and dtn parameters.

FIG. 1b shows the DSQR double offset hyperbola of the PSTM migration defined with the (dtn, $\tau_0$) parameters.

In the context of the PSTM migration, $x_{max}$ represents the maximum offset and aperture of the migration.

The (dtn, $\tau_0$) parameters defined relative to the velocity V and anellipticity η are thus used to make the PSTM NMO correction $CORR_{PSTM}$=t−$\tau_0$ to be applied to the offset x traces independent of $\tau_0$ (equation 7b)):

$$Corr_{PSTM}(x) = -\tau_0 + \sqrt{\frac{\tau_0^2}{4} + \frac{dtn(dtn + 2\tau_0)(x - x + h)^2}{x_{max}^2}} + \sqrt{\frac{\tau_0^2}{4} + \frac{dtn(dtn + 2\tau_0)(x - x - h)^2}{x_{max}^2}}$$

Therefore, this is a static PSTM correction. In other words, the se of aperture samples x−$x_m$ of an "iso-offset" cube are offset by the same time for a given (dtn, $\tau_0$) pair.

By analysing the (dtn, $\tau_0$) parameters in several picking times, the method according to the invention can be used in particular to determine the (V, η) parameters necessary for processing including an anelliptic NMO correction of the traces of a CMP gather.

The said process includes the steps presented below in a simplified manner.

During the preliminary step, an analysis volume is defined including several nodes (dtn, $\tau_0$).

The following are performed for all nodes in this volume:
firstly, according to equation (7a), the static NMO correction of traces in the studied CMP gather, as a function of the values of the dtn, $\tau_0$ parameters at the node considered, the said static correction being valid for any picking time;
secondly, the semblance as a function of time associated with the correction made in the previous step is calculated.

Finally, the following are determined for each time in the several picking times:
firstly, the node (dtn, $\tau_0$) used to make an optimum correction, for example with regard to the semblance criterion (this type of criterion typically being used in seismic processing to "measure the horizontality" of reflection curves and to determine the reliability of the picking);
secondly, the values of the dtn, $\tau_0$ parameters at the said maximum semblance node are converted to values of the velocity V and anellipticity η parameters at the said picking time considered.

The velocity law (in other words all (picking time, V)) pairs and the anellipticity law (all (picking time, η)) pairs are thus defined.

Finally, the NMO correction for all seismic traces may be made using these velocity V and anellipticity η laws in equation (1a) for the anelliptic offset hyperbola.

Similarly, and as will be described in detail later, the (dtn, $\tau_0$) parameters of the static PSTM migration (see equation 7b)) may also be checked. The velocity V and anellipticity η laws are then determined and may be used to make the PSTM migration in the DSQR equation (1b) for the double anelliptic offset hyperbola.

Figure 2:
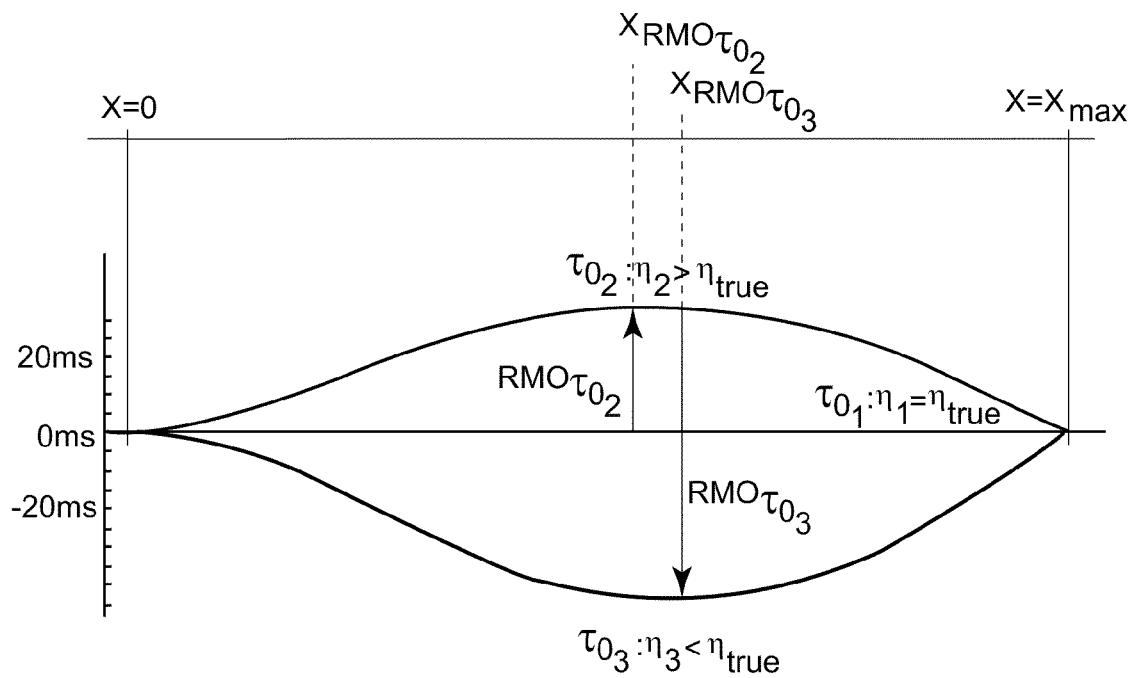
FIG. 2 illustrates the effect of the $\tau_0$ parameter of the reflection curve corrected by the NMO correction.

FIG. 2 illustrates the effect of the parameter $\tau_0$ (and therefore the anellipticity η according to equation (2) on the curvature residues after the NMO correction.

Note that the vertical time scale of the curve in FIG. 2 is exaggerated so that this effect can be clearly understood.

Three curves are shown in FIG. 2, for which the dtn parameter is fixed to the correct value and the parameter $\tau_0$ is assigned different values.

The central curve shows the case in which $\tau_0$ is equal to its correct value $\tau_{01}$, in other words when the corresponding anellipticity $\eta_1$ is equal to its true value $\eta_{true}$. As expected, the corrected reflection curve is then horizontal.

The upper curve shows the case in which $\tau_0$ is equal to a value $\tau_{02}$ less than its correct value $\tau_{01}$, the corresponding anellipticity $\eta_2$ being greater than its true value $\eta_{true}$.

The lower curve represents the case in which $\tau_0$ is equal to a value $\tau_{03}$ greater than its true value $\tau_{01}$, the anellipticity $\eta_3$ being less than its true value $\eta_{true}$.

Note that these lower and upper curves show that the "horizontality" of the corrected reflection curve is acceptable at near offset (x≈0) and at far offset (x≈$x_{max}$).

On the other hand, significant curvature residues are observed when the offset x no longer tends towards one of these limiting values 0 and $x_{max}$. In particular, particularly significant residues are observed for an offset x centred in the middle of the offsets range.

For example, and as is shown in FIG. 2, when $\tau_0$ is equal to $\tau_{02}$, an $RMO\tau_{02}$ residual correction must be made to the offset traces $x_{RMO}\tau_{02}$. Similarly, when $\tau_0$ is equal to $\tau_{03}$, a residual correction $RMO\tau_{03}$ must be made to offset traces $x_{RMO}\tau_{03}$.

Due to these significant curvature residues, the offsets range can be used almost in its entirety in order to determine the anellipticity η.

Therefore, setting parameters in (dtn, $\tau_0$) for the NMO correction make it possible to use available data for all offsets (x between 0 and $x_{max}$) in determining the anellipticity η.

As has already been mentioned, this is not the case for NMO corrections for which parameters have been set with V and η for which the estimate of the anellipticity η is made essentially using far offset data.

Thus, the effect of the new anelliptic parameter $\tau_0$ is distributed on all offsets, unlike the anellipticity η that only affects far offsets. Therefore, the "behaviour" of the parameter $\tau_0$ gives a better constraint on anellipticity values.

As already mentioned above, the optimum dtn and $\tau_0$ parameters are determined within a 3D analysis volume ($t_0$, dtn, $\tau_0$).

Several nodes (dtn, $\tau_0$), in other words several pairs of dtn, $\tau_0$ parameters for which values are known, are considered in the said analysis volume.

Nodes are usually regularly spaced from each other, by an increment Δdtn on the dtn axis and an increment Δ$\tau_0$ on the $\tau_0$ axis.

Minimum values $dtn_{min}$, $\tau_{0min}$, $t_{0min}$ and maximum values $dtn_{max}$, $\tau_{0max}$, $t_{0max}$ of the $\tau_0$ and $t_0$ respectively provide a means of defining the limits of the said analysis volume.

Advantageously, plausible values of the velocity parameter V and the anellipticity parameter η may be used to define a corridor [$dtn_{min}(t_0)$, $dtn_{max}(t_0)$], [$\tau_{0min}(t_0)$, $\tau_{0max}(t_0)$] inside the said analysis volume.

This corridor restricts the analysis volume and therefore the number of nodes (dtn, $\tau_0$) that have to be considered to determine the optimum pair (dtn, $\tau_0$).

Although use of the said corridor is beneficial for the efficiency of the process according to the invention, it also provides a means of constraining solution towards the right phenomena, without needing to consider incompatible (dtn, $\tau_0$)

(and therefore V, η)) pairs, for example related to multiple reflections or miscellaneous interference phenomena.

Figure 3A:
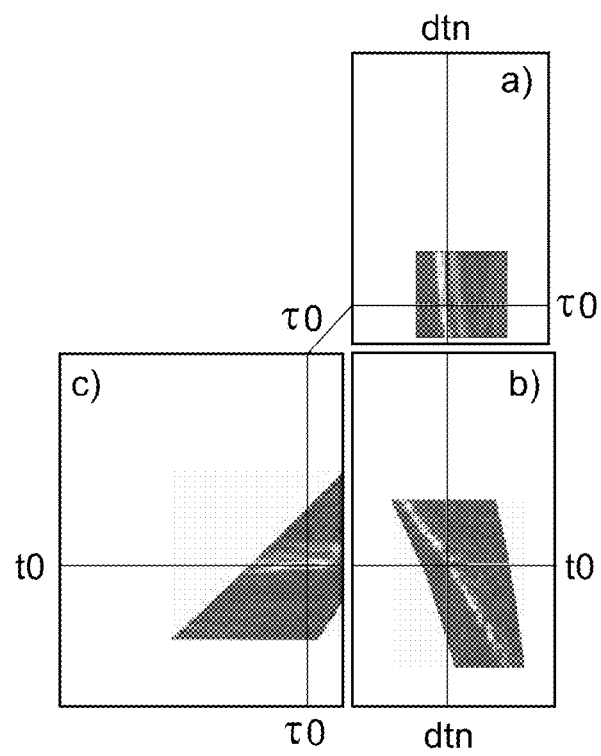
FIGS. 3a and 3b represent the analysis volume ($t_0$, dtn, $\tau_0$) in which the bispectral picking of the dtn and $\tau_0$ parameters according to the invention is made.
Figure 3B:
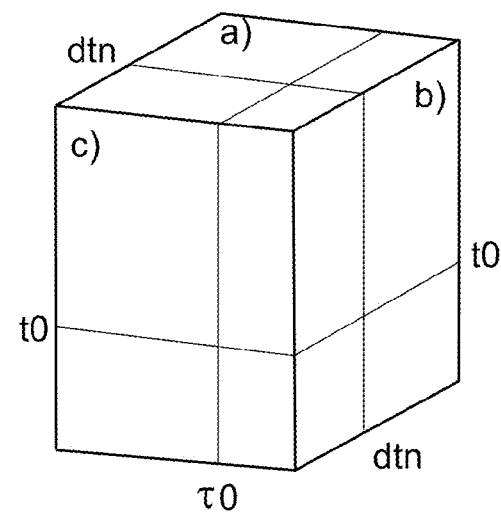

FIGS. 3a and 3b represent the said analysis volume ($t_0$, dtn, $\tau_0$) in the context of an example of true seismic data processing during an NMO correction done according to the process according to the invention.

FIG. 3a represents three 2D panels a, b and c of the analysis volume:
panel a is a panel (dtn, $\tau_0$) with constant $t_0$;
panel b is a panel (dtn, $t_0$) with constant $\tau_0$;
panel c is a panel ($\tau_0$, $t_0$) with constant dtn.

FIG. 3b diagrammatically shows the 3D analysis volume ($t_0$, dtn, $\tau_0$) and three intersections with this volume along three planes with constant $t_0$, $\tau_0$, dtn respectively, each of these intersections being projected onto the corresponding side a, b or c in FIG. 3a.

Panels (dtn, $\tau_0$) with constant $t_0$ (panel a in the above example) are panels in which the bispectral picking of the dtn and $\tau_0$ parameters is made, for example according to the maximum NMO correction semblance criterion, for the considered picking time $t_0$.

The [$dtn_{min}(t_0)$, $dtn_{max}(t_0)$] [$\tau_{0min}(t_0)$ $\tau_{0max}(t_0)$] corridor mentioned above for the effective analysis inside the analysis volume is also shown in FIG. 3a (lighter zone on each panel).

The seismic data sampling time step $\Delta t_0$ defines the difference between two successive picking times (times for which the maximum associated semblance node (dtn, $\tau_0$) is determined) and therefore the number of bispectral picking panels to be considered.

Automatic picking also provides a means of extracting the dtn, $\tau_0$ parameters at a density that is greater when the $\Delta t_0$ increment between picking times is small.

Sampling of the analysis parameters dtn and $\tau_0$ is directly related to the resolution of the seismic exploration; dtn and $\tau_0$ effectively have the same dimensions as seismic records.

The systematic search for the maximum semblance, conventionally known in itself, provides a means of determining the (dtn, $\tau_0$) pair providing best focus, for a given picking time $t_0$.

Parabolic interpolations about the values of nodes (dtn, $\tau_0$) can also provide a means of evaluating values of the dtn, $\tau_0$ parameters between the different nodes that have actually been picked. And in particular this type of evaluation makes determination even more precise (in contrast to determination limited to nodes in the corridor) of the dtn, $\tau_0$ parameter pair maximising the semblance function.

Finally, the velocity V and anellipticity η parameters are determined, always for the picking time $t_0$ considered, by using the above mentioned conversion equations (4) and (5).

FIG. 4 shows the comparison between the two approaches (V, $V_{an}$) and (dtn, $\tau_0$), by representing the bispectral picking panel for each, for a given picking time.

The figure at the right illustrates the conventional approach (V, $V_{an}$) for which the two axes are the velocity axes (the anellipticity η being related to the ratio of these two velocities according to $$\eta = \frac{1}{8}\left(\frac{V_{an}^4}{V^4} - 1\right)\right).$$

The left figure illustrates the approach (dtn, $\tau_0$) according to the invention for which the two axes are time axes.

It is important to note from the study in FIG. 4 that the dtn and $\tau_0$ parameters appear to be decorrelated. This "decorrelation" is striking when the two approaches are compared, spreading of the (dtn, $\tau_0$) spectrum actually being much narrower than spreading of the (V, $V_{an}$) spectrum.

Therefore the picking made in the context of the (dtn, $\tau_0$) approach according to the invention is more precise than the approach carried out in conventional methods.

Furthermore, this decorrelation enables filtering of the dtn and $\tau_0$ pickings separately, while keeping NMO corrections. This is not the case for the V and η parameters for which a reduction in one of the parameters must necessarily be compensated by an increase in the other and vice versa.

And due to interpolations and individual filtering of parameters according to the invention, dtn and $\tau_0$, it is then possible to perform simultaneous interpolation and filtering of the standard NMO correction parameters V and η.

FIG. 5 shows non-linear correspondence according to equations (4) and (5) mentioned above, between the pair of time parameters (dtn, $\tau_0$) and the pair of velocity parameters (V, $V_{an}$).

FIG. 6 shows, from left to right:
a CMP gather of real seismic traces before NMO correction;
the picking of the dtn parameter corresponding to this gather of traces;
the picking of the $\tau_0$ parameter corresponding to this gather of traces.

The straight line $\tau_0 = t_0$ on the picking of the parameter $\tau_0$ at the right in FIG. 6, corresponds to the purely hyperbolic reflection curves.

From right to left, FIG. 7 represents the semblance function and the velocity V and the anellipticity η functions (see equation (4) and (5)) deduced from the picking of the dtn and $\tau_0$ parameters shown in FIG. 6.

On this example of real seismic data processing, it can be seen that the values of V and η obtained generally corresponding to a semblance of more than 40%.

The following description contains details of two particular embodiments of the invention.

The first of these modes relates to a process for determining optimum parameters to make an anelliptic NMO correction to the traces of a CMP gather (see the different steps shown in the flowchart in FIG. 8a).

With reference to FIG. 8a, this first embodiment includes an initialisation step 1a during which the following operations are carried out in sequence:
determination of the limits of the analysis volume [$dtn_{min}$, $dtn_{max}$] [$\tau_{0min}$, $\tau_{0max}$] [$t_{0min}$, $t_{0max}$];
calculation of NMO corrections $CORR_{NMO}$ (equation (7a)) for all offsets and for all nodes (dtn, $\tau_0$) included in the analysis volume;
delimitation inside the analysis volume of the corridor [$dtn_{min}(t_0)$, $dtn_{max}(t_0)$] [$\tau_{0min}(t_0)$ $\tau_{0max}(t_0)$] of plausible velocity and anellipticity values.

Once the initialisation step 1a has been carried out, a step 2a to calculate velocity $V(t_0)$ and anellipticity $\eta(t_0)$ laws is performed for each gather of CMP traces.

This step 2a comprises:
a first operation 3a carried out for each node (dtn, $\tau_0$) in the corridor defined in the initialisation step 1a, during which the following operations are carried out in sequence for each picking time $t_0$:
application of static NMO corrections $CORR_{NMO}$ for all offsets along the corridor, precalculated during the initialisation step 1a;
calculation of the semblance function on data corrected along the corridor using a time window appropriate to the dominant wavelet;

summation ("stack" calculation) of data corrected along the corridor (only near offset data can be used advantageously for this purpose);

a second operation 4a carried out for each picking time $t_0$ (the said times being at intervals of $\Delta t_0$ between $[t_{0min}, t_{0max}]$ during which the following operations are carried out:

search for maximum semblance in the $[dtn_{min}(t_0), dtn_{max}(t_0)]$ $[\tau_{0min}(t_0)\tau_{0max}(t_0)]$ corridor of the bispectral panel (dtn, $\tau_0$);

check the fact that the position in (dtn, $\tau_0$) at the maximum semblance corresponds to a summation extreme value for the same values dtn and $\tau_0$;

creation of the $dtn(t_0), \tau_0(t_0)$ and semblance ($t_0$) series;

a third operation 5a designed to select and adjust the pickings obtained, during which the following operations are carried out:

increasing sort of the semblance series ($t_0$);

validation of pickings dtn and $\tau_0$ for which the distance in time to the highest semblance pickings is greater than a predefined value;

adjustment of picking dtn and $\tau_0$ values validated by parabolic interpolations using surrounding values;

retention of picked, validated and adjusted values if it is possible to calculate the Dix interval velocities with the pickings with the highest similarities.

a fourth operation 6a designed to use equations (3) and (4) to convert picked, validated and adjusted and retained values of dtn and $\tau_0$ during operation 5a, into velocity V and anellipticity $\eta$ laws.

The velocity V and anellipticity $\eta$ laws as a function of time are thus perfectly determined. The anelliptical NMO correction of seismic traces in the CMP gather can thus be done precisely.

The second particular embodiment of the invention relates to a process for determination of optimum parameters for anelliptical PSTM migration of traces in a CMP gather.

This second embodiment may be included in a generalisation of the first mode discussed above.

As has already been demonstrated, the use of the (dtn, $\tau_0$) parameters enables static PSTM NMO corrections (see equation (7b)).

In the context of a PSTM NMO correction, this application has the same advantages as previously discussed for the NMC obliqueness correction.

More precisely, it will be noted that the first embodiment is only a special case of the second embodiment corresponding to the case of a zero migration aperture.

With reference to FIG. 8b, the second embodiment includes an initialisation step 1b during which the following operations are carried out in sequence:

determine the limits of the analysis volume $[dtn_{min}, dtn_{max}]$, $[\tau_{0min}, \tau_{0max}]$, $[t_{0min}, t_{0max}]$;

calculate NMO corrections $CORR_{PSTM}$ (equation (7b)) for all nodes (dtn, $\tau_0$) included in the analysis volume and for all migration offsets inside the migration aperture;

delimitation of plausible velocity and anellipticity values inside the analysis volume of the corridor $[dtn_{min}(t_0), dtn_{max}(t_0)]$ $[\tau_{0min}(t_0)\tau_{0max}(t_0)]$.

Once this initialisation step 1b has been done, the said first embodiment creates a step 2b to calculate the velocity $V(t_0)$ and anellipticity $\eta(t_0)$ laws for each gather of CMP traces.

This step 2b comprises:

a first operation 3b done for each node (dtn, $\tau_0$) of the corridor defined during the initialisation step 1a, during which the following are carried out in sequence:

for each offset class, operations for:

application on all midpoints inside the migration aperture along the corridor, of static corrections $CORR_{PSTM}$ precalculated during the initialisation step 1b;

summation of corrected midpoints along the corridor.

for each picking time $t_0$, operations to:

calculate the semblance function on corrected data along the corridor using a time window appropriate to the dominant wavelet;

summation (stack calculation) of data corrected along the corridor (only data with small offsets can be used advantageously for this purpose):

a second operation 4b carried out for each picking time $t_0$, similar to the operation 4a described above, to create the $dtn(t_0), \tau_0(t_0)$ and semblance $t_0$ series;

a third operation similar to operation 5b described above, designed to select and adjust the pickings obtained;

a fourth operation 6b similar to operation 5a described above, designed to convert values of dtn, $\tau_0$ into velocity V and anellipticity $\eta$ laws.

The velocity V and anellipticity $\eta$ laws as a function of time are thus perfectly determined. And the PSTM migration of seismic traces in the CMP gather may thus be done accurately.

FIG. 9 illustrates the second embodiment of the invention that has just been described.

Seismic data are initially grouped into iso-offset cubes.

As has just been described, NMO corrections $CORR_{PSTM}$ are applied (see first operation in step 3b) for each offset class (namely for each iso-offset cube) on all midpoints. The arrow marked with the MIG label in FIG. 9 illustrates this operation.

The midpoints thus corrected are then summated during a second operation in step 3b, the arrow labelled STACK in FIG. 9 illustrating this operation.

These two MIG and STACK operations are specific to the second embodiment of the invention (PSTM migration).

The following operations are performed in the context of each of the two embodiments discussed (the NMO obliqueness correction, as we have described, corresponding to the special case of a PSTM migration with zero migration aperture).

The semblance is then calculated for each picking time (second operation in step 3a for the NMO correction only, third operation in step 3b for the PSTM migration), the arrow labelled "semblance" in FIG. 9 illustrating this operation.

Obviously, the MIG, STACK and semblance calculation operations are implemented for each node (dtn, $\tau_0$).

The "automatic bispectral picking" mentioned in FIG. 9 corresponds to picking of maximum semblance parameters (dtn, $\tau_0$) for each picking time $t_0$ (operations 4a, 4b in FIGS. 8a, 8b respectively). The arrow labelled MAX illustrates the search for the maximum semblance.

Finally, the pickings of the picked parameters (dtn, $\tau_0$) are converted into velocity V and anellipticity $\eta$ laws (operations 6a, 6b in FIGS. 8a, 8b and arrow labelled CONV in FIG. 9).

The invention claimed is:

1. A method of determining velocity V and anellipticity $\eta$ parameters for processing seismic traces obtained from seismic receivers in a common midpoint (CMP) gather including an anelliptic (Normal Move Out) NMO correction, the method comprising:

defining a plurality of nodes (dtn, $\tau_0$) in the CMP gather of a series of seismic traces, at least a portion of said traces corresponding to signals reflected by geological interfaces of a subsurface zone, said nodes being indicative of parameters dtn and $\tau_0$, wherein dtn represents the NMO correction for the maximum offset and $\tau_0$ represents a zero offset travel time in hyperbolic coordinates;

at a node (dtn, $\tau_0$), performing static NMO correction of traces in the CMP gather as a function of the values of said parameters dtn, $\tau_0$ at the node considered;

calculating a semblance function associated with said NMO correction for the node considered;

for each picked time $t_0$, determining a node (dtn ($t_0$), $\tau_0$ ($t_0$)) having a maximum semblance;

converting the dtn ($t_0$) and $\tau_0$ ($t_0$) parameters of the node having the maximum semblance so as to obtain velocity V ($t_0$) and anellipticity $\eta(t_0)$ laws; and processing, on a processor, the seismic traces in view of the obtained velocity V($t_0$) and anellipticity $\eta(t_0)$ laws, the output of said processing used to represent the seismic traces in one or more images of at least a portion of the geological interfaces of said subsurface zone.

2. The method according to claim 1, further comprising, for each node (dtn, $\tau_0$), a stacking step of the corrected seismic traces, following the semblance function calculation step.

3. The method according to claim 2, wherein the stacking of corrected traces is performed using only near offset traces.

4. The method according to claim 1, further comprising a step of selecting and adjusting the pickings obtained, following the step implemented for determining the maximum semblance node (dtn ($t_0$), $\tau_0$ ($t_0$)) for each picked time $t_0$, before the conversion step.

5. The method according to claim 4, wherein the step of selecting and adjusting the pickings comprises a step of only retaining pickings dtn and $\tau_0$ for which a time to the highest semblance pickings is greater than a predefined value.

6. The method according to claim 5, wherein the step of selecting and adjusting the pickings also comprises a step of adjusting the retained pickings dtn and $\tau_0$ by parabolic interpolations using values related to the picked values.

7. The method according to claim 1, wherein the processing applied to seismic traces is an NMO correction process implementing a static correction $CORR_{NMO}$.

8. The method according to claim 1, wherein the processing applied to seismic traces is a PSTM migration using a static NMO correction $CORR_{PSTM}$.

9. A method for determining in one pass a velocity V and an anellipticity $\tau$ for processing seismic traces obtained from seismic receivers in a common midpoint (CMP) gather of a series of seismic traces, the method comprising:

defining a plurality of nodes (dtn, $\eta_0$) in the CMP gather, at least a portion of said traces corresponding to signals reflected by geological interfaces of a subsurface zone, said nodes being indicative of parameters dtn and $\tau_0$, wherein dtn represents an anelliptic (Normal Move Out) NMO correction for a maximum offset and $\tau_0$ represents a zero offset travel time in hyperbolic coordinates;

at a node (dtn, $\tau_0$), performing static NMO correction of traces in the CMP gather as a function of the values of said parameters dtn, $\tau_0$;

calculating a semblance function associated with said NMO correction for the node considered;

for each picked time $t_0$, determining a node (dtn ($t_0$), $\tau_0$ ($t_0$)) having a maximum semblance;

converting the dtn ($t_0$) and $\tau_0$ ($t_0$) parameters of the node having the maximum semblance so as to obtain velocity V ($t_0$) and anellipticity $\eta(t_0)$ laws; and processing, on a processor, the seismic traces in view of the obtained velocity V($t_0$) and anellipticity $\eta(t_0)$ laws, the output of said processing used to represent the seismic traces in one or more images of at least a portion of the geological interfaces of said subsurface zone.

10. The method according to claim 9, further comprising, for each node (dtn, $\tau_0$), a stacking step of the corrected seismic traces, following the semblance function calculation step.

11. The method according to claim 10, wherein the stacking of corrected traces is performed using only near offset traces.

12. The method according to claim 9, further comprising a step of selecting and adjusting the pickings obtained, following the step implemented for determining the maximum semblance node (dtn ($t_0$), $\tau_0$ ($t_0$)) for each picked time $t_0$, before the conversion step.

13. The method according to claim 12, wherein the step of selecting and adjusting the pickings comprises a step of only retaining pickings dtn and $t_o$ for which a time to the highest semblance pickings is greater than a predefined value.

14. The method according to claim 13, wherein the step of selecting and adjusting the pickings also comprises a step of adjusting the retained pickings dtn and $\tau_0$ by parabolic interpolations using values related to the picked values.

15. The method according to claim 9, wherein the processing applied to seismic traces is an NMO correction process implementing a static correction $CORR_{NMO}$.

16. The method according to claim 9, wherein the processing applied to seismic traces is a PSTM migration using a static NMO correction $CORR_{PSTM}$.

17. A computing device configured to determine in one pass a velocity V and an anellipticity $\eta$ for processing seismic traces obtained from seismic receivers in a common midpoint (CMP) gather of a series of seismic traces, the computing device comprising:

a processor configured to define a plurality of nodes (dtn, $\tau_0$) in the CMP gather, at least a portion of said traces corresponding to signals reflected by geological interfaces of a subsurface zone, said nodes being indicative of parameters dtn and $\tau_0$, wherein dtn represents an anelliptic (Normal Move Out) NMO correction for a maximum offset and $\tau_0$ represents a zero offset travel time in hyperbolic coordinates;

at a node (dtn, $\tau_0$), perform static NMO correction of traces in the CMP gather as a function of the values of said parameters dtn, $\tau_0$;

calculate a semblance function associated with said NMO correction for the node considered;

for each picked time $t_0$, determine a node (dtn ($t_0$), $\tau_0$ ($t_0$)) having a maximum semblance;

convert the dtn ($t_0$) and $\tau_0$ ($t_0$) parameters of the node having the maximum semblance so as to obtain velocity V ($t_0$) and anellipticity $\eta(t_0)$ laws; and process the seismic traces in view of the obtained velocity V ($t_0$) and anellipticity $\eta(t_0)$ laws, the output of said processing used to represent the seismic traces in one or more images of at least a portion of the geological interfaces of said subsurface zone.

* * * * *